United States Patent

Timpany

[11] Patent Number: 5,282,487
[45] Date of Patent: Feb. 1, 1994

[54] FLOW CONTROL SYSTEM

[76] Inventor: Peter L. Timpany, 428 Oakridge Way S.W., Calgary, Alberta, Canada, T2V 1T4

[21] Appl. No.: 963,479

[22] Filed: Oct. 19, 1992

[51] Int. Cl.$^5$ .............................................. B67D 5/54
[52] U.S. Cl. ...................................... 137/8; 137/209; 137/486; 137/574; 137/601
[58] Field of Search ................... 137/8, 206, 209, 486, 137/571, 574, 601, 386, 391

[56] References Cited

U.S. PATENT DOCUMENTS

| | | | |
|---|---|---|---|
| 796,672 | 8/1905 | Priestman | 137/209 |
| 863,641 | 8/1907 | Priestman | 137/209 |
| 899,750 | 9/1908 | Miller | 137/209 X |
| 1,063,595 | 6/1913 | Rein | 137/209 |
| 1,202,049 | 10/1916 | Gamble | 137/209 |
| 2,823,692 | 2/1958 | Riis-Carstensen | 137/206 X |
| 3,424,186 | 1/1969 | Sparks | 137/209 X |
| 3,971,549 | 7/1976 | Habig | 137/209 X |
| 4,024,060 | 5/1977 | Hughes | 137/209 X |
| 4,877,051 | 10/1989 | Day | 137/486 |

Primary Examiner—John Rivell
Attorney, Agent, or Firm—Shlesinger, Arkwright & Garvey

[57] ABSTRACT

Existing devices for controlling flow in water and wastewater treatment systems utilize mechanical valves, adjustable height weirs and gates which are expensive to manufacture and maintain, and in some circumstances such as during winter, difficult to operate. A relatively simple substitute for such devices to control the flow from one zone or area to another includes a casing defining a weir chamber, a submerged weir in the chamber, an inlet on one side of the casing for introducing liquid into the chamber, a liquid outlet from the chamber on the other side of the weir, connected to a second zone or area at a flooded level below the liquid level in the second zone or area, and a duct in the casing for introducing gas under pressure into and out of the chamber for actively controlling the liquid level in the chamber and consequently the flow of liquid over the weir between the inlet and outlet. The use of the above described apparatus involves a novel method of controlling the flow of liquid over a weir.

16 Claims, 10 Drawing Sheets

FLOW CONTROL SYSTEM

BACKGROUND OF THE INVENTION

1. Field Of The Invention

This invention relates to an apparatus for controlling the flow of a fluid from one zone or area to another, and in particular, to a submerged weir apparatus for effecting such control.

While the apparatus of the present invention is primarily intended for use in wastewater systems, it will be appreciated that the apparatus can also find use in other systems involving the flow of fluids such as between chemical reaction, water treatment, or other zones. The usual method for controlling the flow of water in wastewater treatment systems involves the use of mechanical valves and gates which are relatively expensive to manufacture and maintain, and which may cause significant head loss and unstable hydraulic patterns in the systems. Moreover, it is often difficult to use valves and gates for controlling flow rates between zones or areas of baffled reactors. Finally, it is not economically feasible to use existing systems for accurately and evenly distributing water between zones with flow over long weir lengths, while simultaneously controlling the flow between one treatment zone or area and another zone or area.

2. Discussion Of The Prior Art

The present invention is based on the knowledge that fluid pressure can be used to control liquid distribution in wastewater treatment systems. Searches in the North American patent literature disclosed U.S. Pat. Nos. 796,672, issued to A. Priestman on Aug. 8, 1905; U.S. Pat. No. 899,750, issued to S.F. Miller on Nov. 17, 1908; U.S. Pat. No. 1,063,595, issued to L.E. Rein on Jun. 3, 1913; U.S. Pat. No. 2,823,692, issued to E. Riis-Carstensen on Feb. 18, 1958; U.S. Pat. No. 4,015,629, issued to T.H. Morgan et al on Apr. 5, 1977; U.S. Pat. No. 4,024,060, issued to C.D. Hughes on May 17, 1977; U.S. Pat. No. 4,596,658, issued to M.G. Madt on Jun. 24, 1986; and U.S. Pat. No. 4,883,602, issued to M.H. Anderson on Nov. 28, 1989. These patents teach the use of vacuum and/or gas pressure for controlling the flow of water between chambers or zones or out of treatment systems. In general, the patented apparatuses are not economically feasible, somewhat complicated or rely on inaccurate, passive, and ineffective methods to control flow. In contradistinction, the present invention is low cost, relatively simple to operate, much more effective for flow control, and involves active flow control using a gas under pressure which can be combined with an external flow or depth of water detector and a connected control unit to actively adjust and control the gas pressure and hence accurately control the flow at all times.

GENERAL DESCRIPTION OF THE INVENTION

A primary objective of the present invention is to provide a relatively simple, no moving parts, reliable apparatus suitable for summer and severe winter weather and is capable of controlling the flow of fluid from one zone or area to another which is highly efficient with low head losses, and can be controlled by a single gas distribution and flow control unit centrally located to control flow through an entire wastewater system.

Another object of the present invention is to make it possible to accurately control the rate of flow between zones or areas of a wastewater treatment system at any time.

Another object of the present invention is to accurately control the depth of water and contact time of reaction in any zone or area of a wastewater treatment system hydraulically connected to another lower elevation zone or area by control the flow over a weir.

Another object of the present invention is to safely, accurately and evenly distribute water flow over long lengths between contiguous zones or cells divided by partitions or baffles while simultaneously controlling the flow and preventing mixing between the zones or cells.

The final objective of the present invention is during treatment by any type of aerator, to prevent the passage of solids from the inlet to the outlet of the flow control device and subsequently after settlement of solids in a first zone, to control the rate of flow of settled treatment wastewater from the first zone or area to a second zone or area, during which the liquid level of the first zone or area can be constant or variable and the second zone or area operates with a minimum controlled level.

According to one aspect, the present invention relates to an apparatus for controlling the flow of liquid from a first zone to a second zone comprising casing means defining a weir chamber, a submerged weir means in said weir chamber; a flooded liquid inlet means on one side of said casing means for introducing liquid from one zone into the weir chamber; liquid outlet means on the other side of said casing means for discharging liquid from the weir chamber to the second zone at a flooded level below the liquid level in said second zone by at least the height of the liquid in said first zone above the weir top; and duct means in said casing means for actively introducing and venting gas to and from said chamber for controlling the liquid level in said weir chamber and consequently the flow of liquid over the weir means between the first and second zones.

According to another aspect, the invention relates to a method for controlling the flow of a liquid from a first zone to a second zone controlled at a lower level comprising the steps of providing a casing between said first and second zones defining a weir chamber and a submerged weir means in the chamber; introducing liquid from one zone into one side of the weir chamber; discharging liquid from the other side of the weir chamber to the second zone; actively introducing gas or air under pressure and venting from said chamber for controlling the liquid level in the weir chamber and consequently the flow of liquid over the weir means between the first and second zones.

BRIEF DESCRIPTION OF THE DRAWINGS

The invention will be described in greater detail with reference to the accompanying drawings, which illustrate preferred embodiments of the invention and wherein.

It will be noted that wherever possible the same reference numerals have been used in the various figures of the drawings to identify the same or similar elements.

DESCRIPTION OF THE PREFERRED EMBODIMENT

Figure 1:
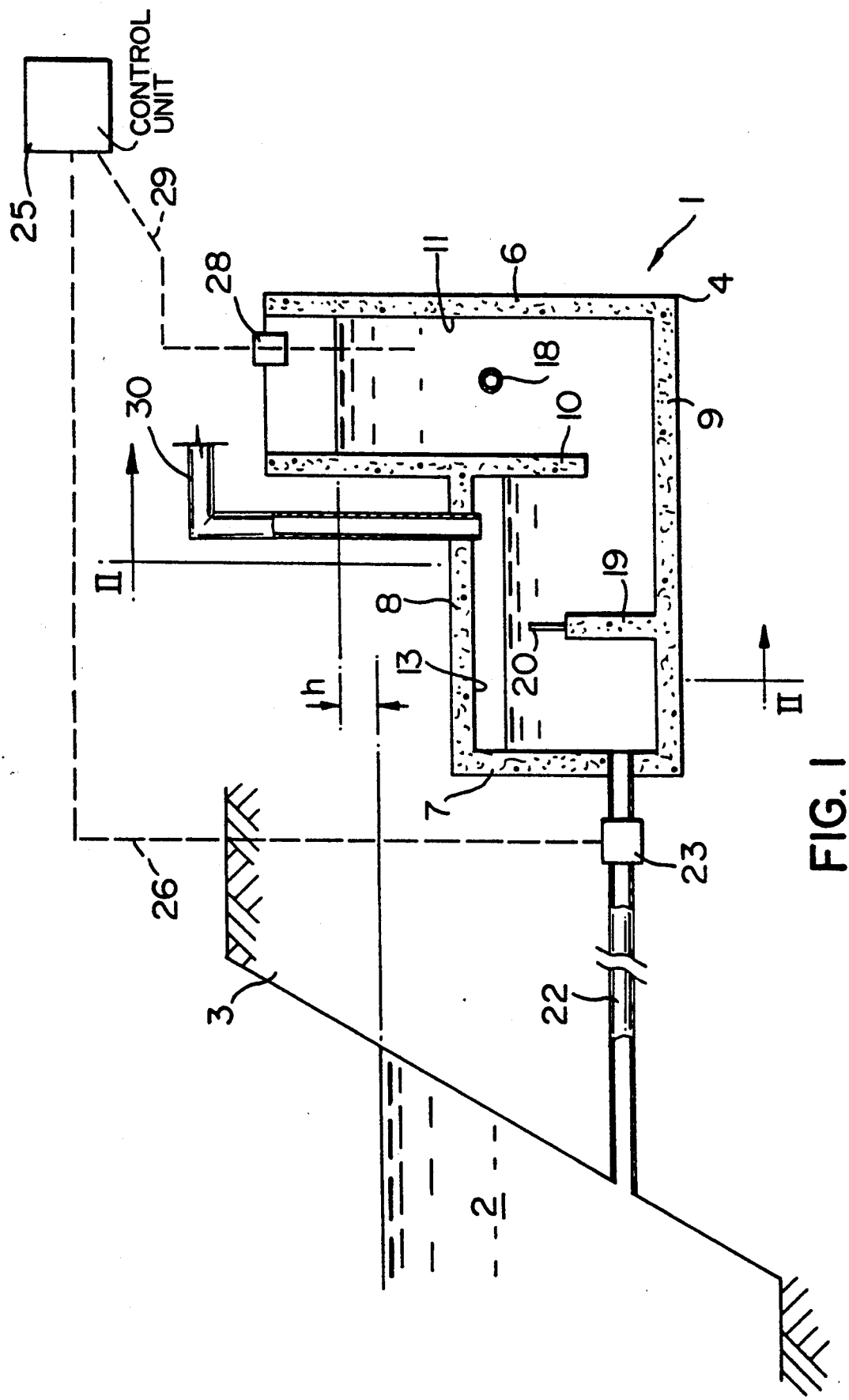
FIG. 1 is a schematic, sectional view of a flow control apparatus in accordance with the present invention.
Figure 2:
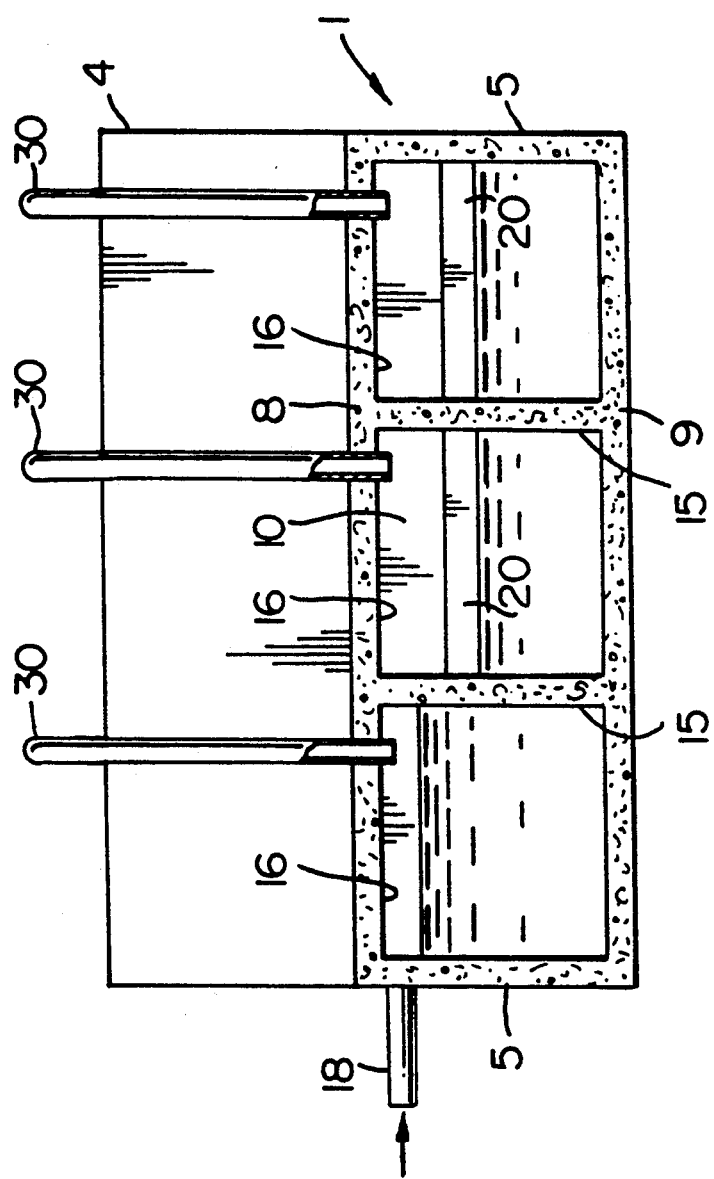
FIG. 2 is a cross-section taken generally along line II—II of FIG. 1.

With reference to FIG. 1, a weir apparatus in accordance with the present invention which is generally indicated at 1 is intended for controlling the flow of liquid from a first treatment zone (not shown) to a second treatment zone 2, the zones being separated by a dam or partition 3. The system includes a generally L-shaped casing 4 defined by side walls 5 (FIG. 2), end walls 6 and 7, a top wall 8 and a bottom wall 9. A partition 10 extending between the sides 5 divides the interior of the casing into an inlet chamber 11 and an outlet chamber 13. A second set of partitions 15 extending downwardly from the top wall 8 to the bottom wall 9 between the end wall 7 and the partition 10 divide the outlet chamber of the casing into three separate weir chambers 16 (FIG. 2). More or less partitions may be used as required. Liquid is introduced into the inlet chamber 11 through an inlet pipe 18 in one end of the casing 4 to a height providing at least sufficient head h above the liquid level in the treatment zone 2 to permit the maximum desired flow through the flow control device. The liquid entering the weir chambers 16 passes over a partition 19 with a submerged weir 20 on the top end thereof. The top of the weir is submerged by at least a sufficient amount below the minimum liquid level in the inlet chamber to permit the maximum required flow over the weir at this minimum liquid level. Liquid is discharged from the casing 4 to whichever one of the three flooded outlet ducts 22 is chosen to receive flow. Each duct 22 is connected to the end wall 7 at an elevation difference sufficiently below the elevation of the minimum liquid level in zone 2 to prevent blowout of gas from chamber 16 to zone 2 at zero flow through said duct 22. Said elevation difference is not less than the maximum elevation of the liquid in said first zone above the weir top. Each duct 22 also includes a flow detector or liquid level detector for treatment zone 2. The detector 23 is connected to a control unit 25 by a cable 26 for confirming the liquid level in zone 2 or flow in outlet duct 22, and to indicate any need for increased or decreased air in order to achieve the desired flow of liquid at any time in any of the outlet ducts 22 or liquid level. It can be appreciated that the apparatus can be modified to be sufficiently flexible to be able to also control the flow over the weir based solely on a time duration or on levels in the first and/or second zone by use of appropriate liquid level detectors without the requirement of a flow detector or meter. In other instances, the accurate control of the rate of flow is necessary and for which a flow detector is required. In still other instances, both flow detectors and liquid level detectors are required to make possible the control of both flow rate and liquid level by control of the flow over the weir. A liquid level detector 28 is also connected to the control unit 25 by a cable 29 to indicate if any abnormal levels require a corrective response.

The liquid level in the weir chambers 16 is controlled by air, which is introduced into and vented from the chambers 16 under positive pressure via a duct or pipe 30 through two control valves (not shown) in the control unit 25. The control of the liquid level in weir chambers 16 thus controls the volume of an air pocket or distinct gas volume substantially defined by outlet chamber 13 and the liquid level in weir chambers 16. The top of chamber 16 is sufficiently above the maximum liquid level in chamber 16 to make possible the maintenance of a distinct gas volume and thus control the flow over the weir even at the maximum flow. It is clear to one familiar with wastewater treatment technology that the same principles of operation and flow control can be achieved for the invention if the air pressure is negative and the weir is located at or above the liquid level for a negative submergence in said first zone. This arrangement, however, is not a preferred embodiment of the apparatus because discharge of foam or gases released from the liquid under a negative pressure, with respect to atmospheric pressure, will flow through the control system and thus may hinder the reliable operation of the air control valves and vacuum system.

Figure 3:
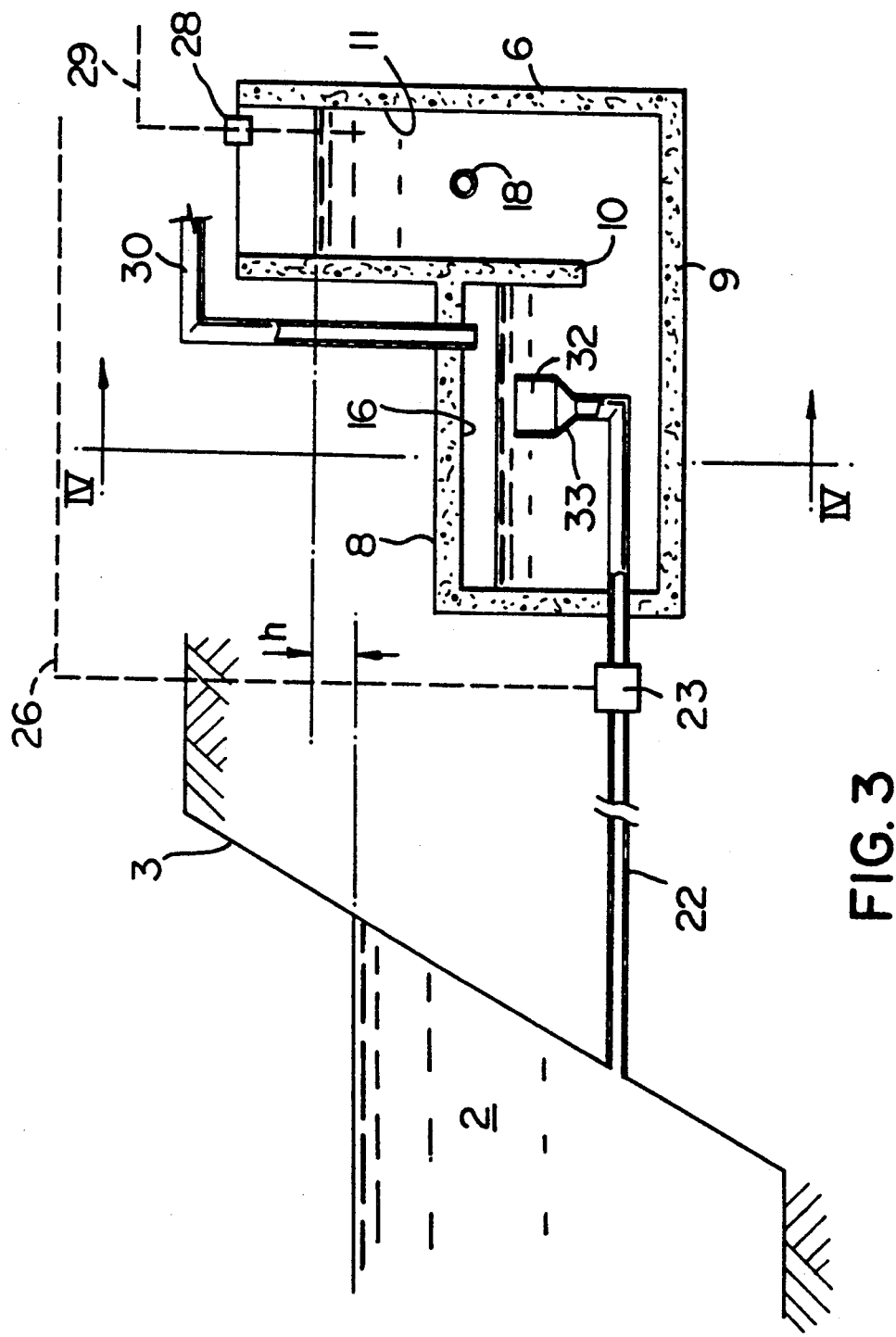
FIG. 3 is a schematic, cross-sectional view of a second embodiment of the flow control apparatus of the present invention.
Figure 4:
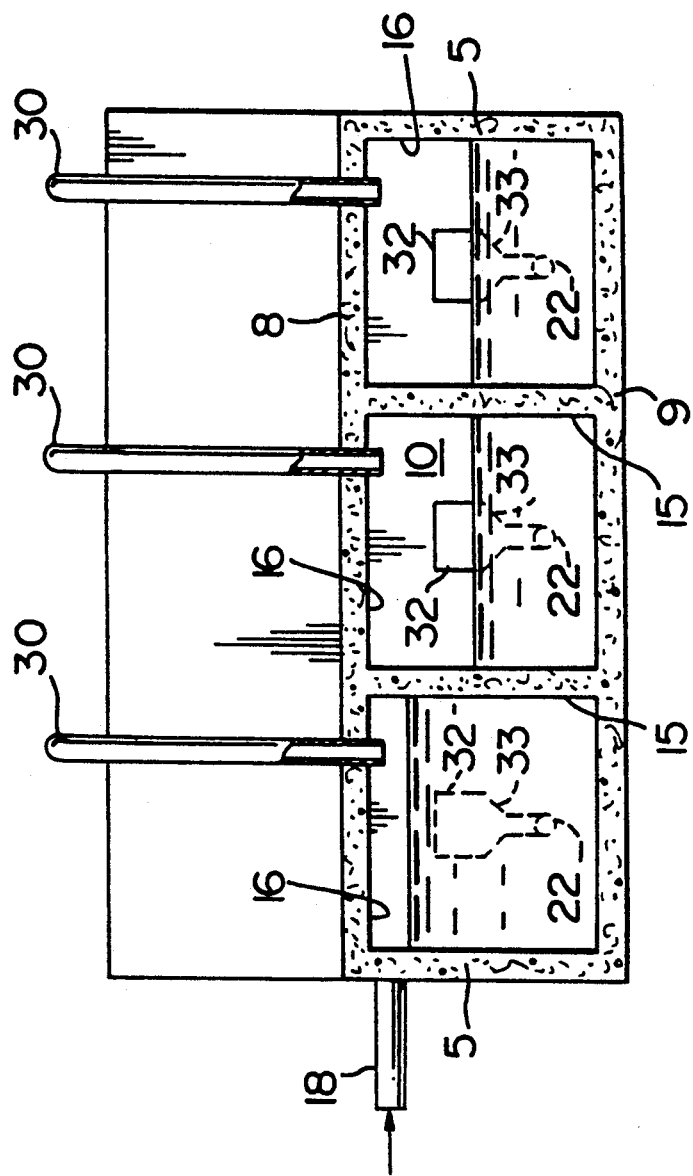
FIG. 4 is a cross-section taken generally along line IV—IV of FIG. 3.

The apparatus of FIGS. 3 and 4 is similar to that of FIGS. 1 and 2, except that the partition 19 and the weir 20 in each chamber 16 are replaced by a submerged cylindrical weir 32 with a frusto-conical bottom 33 connected to the outlet pipe 22 for discharging liquid from the chamber 16.

Figure 5:
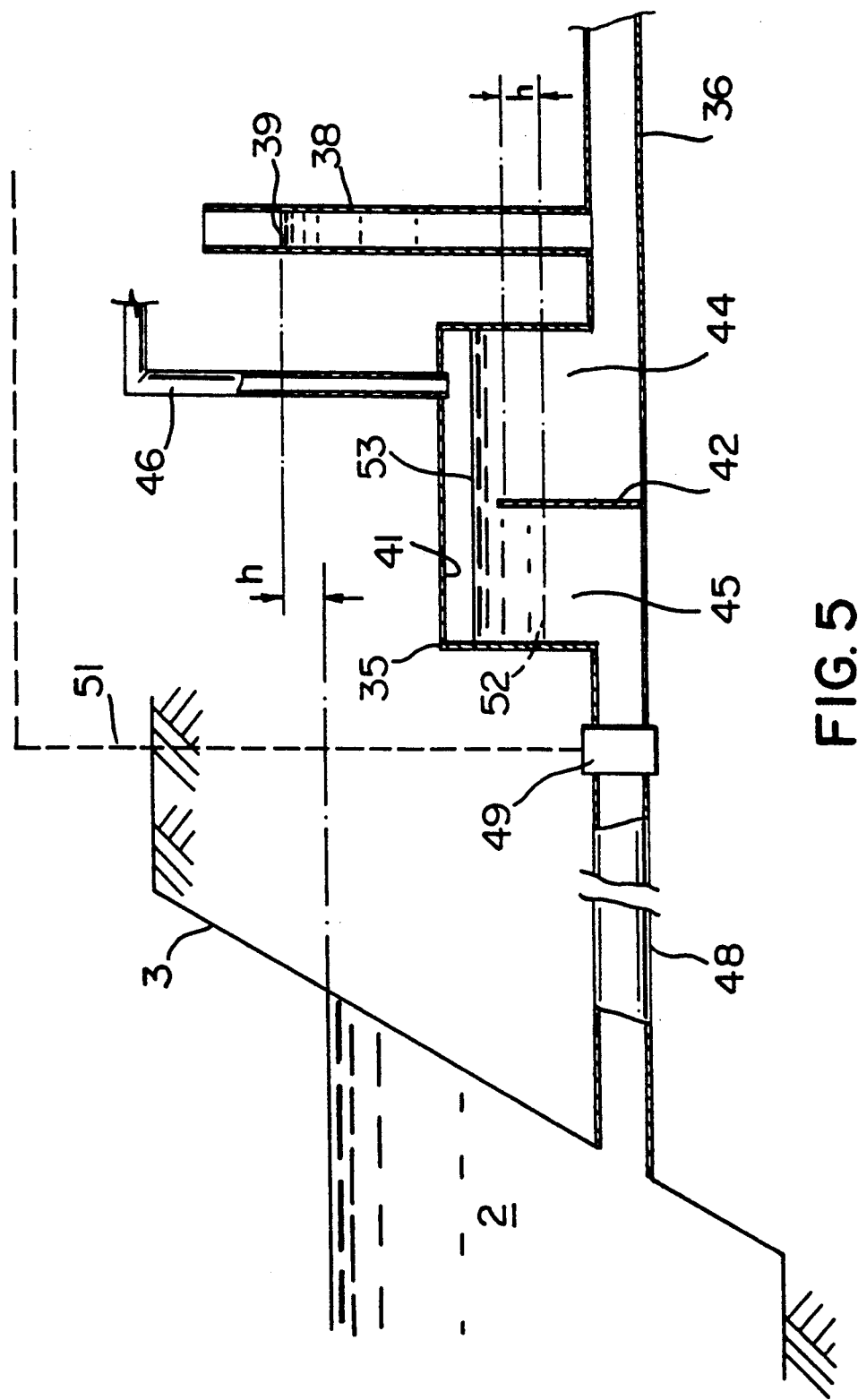
FIG. 5 is a schematic, cross-sectional view of a third embodiment of the flow control apparatus of the present invention.

The apparatus of FIG. 5 is similar to that of FIGS. 1 and 2, except it includes a casing 35 for receiving liquid from a treatment zone (not shown) via an inlet duct 36. A column 38 upstream of the casing 35 in the direction of liquid flow contains liquid at the level 39 which is the inlet pressure head h above the elevation of the treatment zone 2 and which allows the release of trapped air when needed. Column 38 performs the same function of air release from inlet duct 36 to allow liquid flow as does FIG. 1 inlet chamber 11 for inlet pipe 18. The casing 35 defines a chamber 41 containing a submerged weir 42 which divides the chamber 41 into inlet and outlet ends 44 and 45, respectively. Air pressure in the chamber 41 is actively maintained by introducing or venting air under pressure through a pipe 46. Liquid is discharged through the chamber 41 via an outlet pipe 48, which contains a flow detector 49 connected to a control unit (not shown) by a cable 51. Air under pressure introduced or vented through the pipe 46 maintains the liquid level in the chamber 41 between the typical extreme levels 52 and 53, to achieve the desired flow between treatment zones. An air pocket or distinct gas volume is thus maintained in a volume substantially bounded by casing 35 and the maximum liquid level at 53 during periods of maximum flow, and minimum liquid level 52 during periods of zero flow. At zero flow the liquid level in 45 is at elevation 52 and the liquid level in 44 is the head h higher than in 45. At full unhindered flow the liquid level at 53 is well above the top of weir 42.

Figure 6:
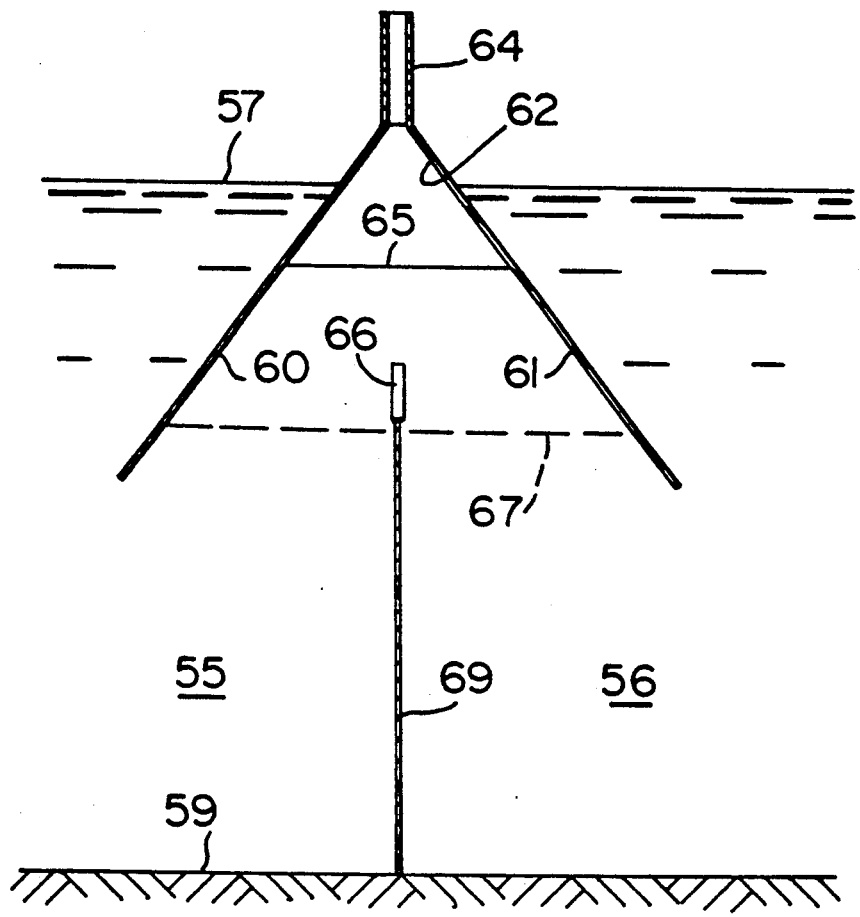
FIGS. 6 and 7 are schematic, cross-sectional views of a fourth embodiment of the flow control apparatus of the present invention.
Figure 7:
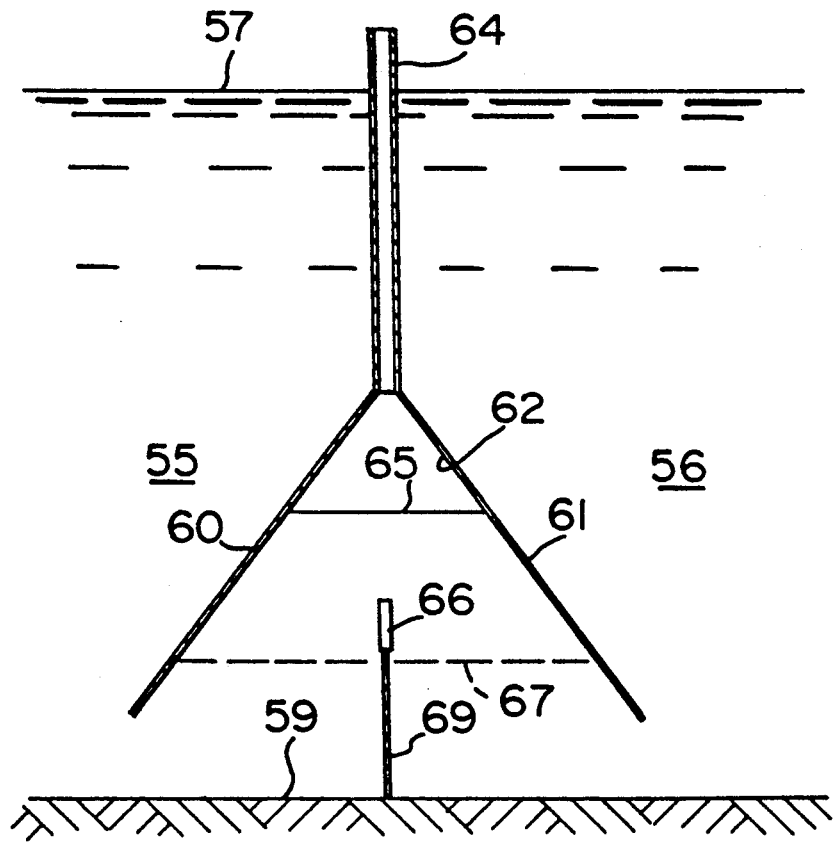

The apparatus of FIGS. 6 and 7, although similar to that of FIG. 5 is an even more simple embodiment of the device to control the flow of liquid directly from a first zone or reactor cell 55 directly to a second contiguous zone or reactor cell 56, without the use of inlet or outlet ducts or pipes. There is a normally small, but sufficient pressure head h (not shown) between zones to permit flow between the zones or cells. The apparatus of FIG. 6 is able to control the flow of liquid between the zones or cells from near the surface 57, while the apparatus of FIG. 7 is able to control the flow of liquid from the middle or near the bottom 59 of cell 55. In each case, the apparatus may include external flow detectors or liquid depth detectors (not shown) and control unit (not shown). Downwardly flaring end walls 60 and 61 define a chamber 62. An air inlet 64 (or inlets) is provided in the top end of the casing defined by the walls 60 and 61. By actively introducing or venting air under pressure, fluid in the chamber 62 can be maintained at any necessary level 65 above the top end of weir 66 to achieve specific desired flow or at a level 67 beneath the top end of the weir 66 to achieve zero flow between zones. The submerged weir 66 is mounted on a partition or baffle 69 extending upwardly from the bottom 59 of the reactor cells. For FIG. 7, the maximum pressure exerted against baffle 69 is defined by the difference between the elevation of the bottom of 61 and the elevation of the top of weir 66. Similarly, the maximum pressure exerted against baffle 69 can most easily be defined for the FIG. 6 apparatus, located near the surface of 55, by the elevation difference between the top of the weir 66 and surface 57. Establishing the maximum liquid depth by detector 23 (not shown) and control of the flow over the weir 66 makes it possible not to exceed the maximum allowable pressure against the baffle 69. The bottom of 61 defines the outlet of the flow control device and is located at an elevation, as for all other embodiments of the invention, sufficiently below the minimum liquid level in the second zone 56 to prevent blowout of gas from the chamber 62 at zero flow over the weir 66. Consequently, control of the minimum liquid level in the second zone 56 is necessary to ensure complete flow control and prevent gas blowout.

Figure 8:
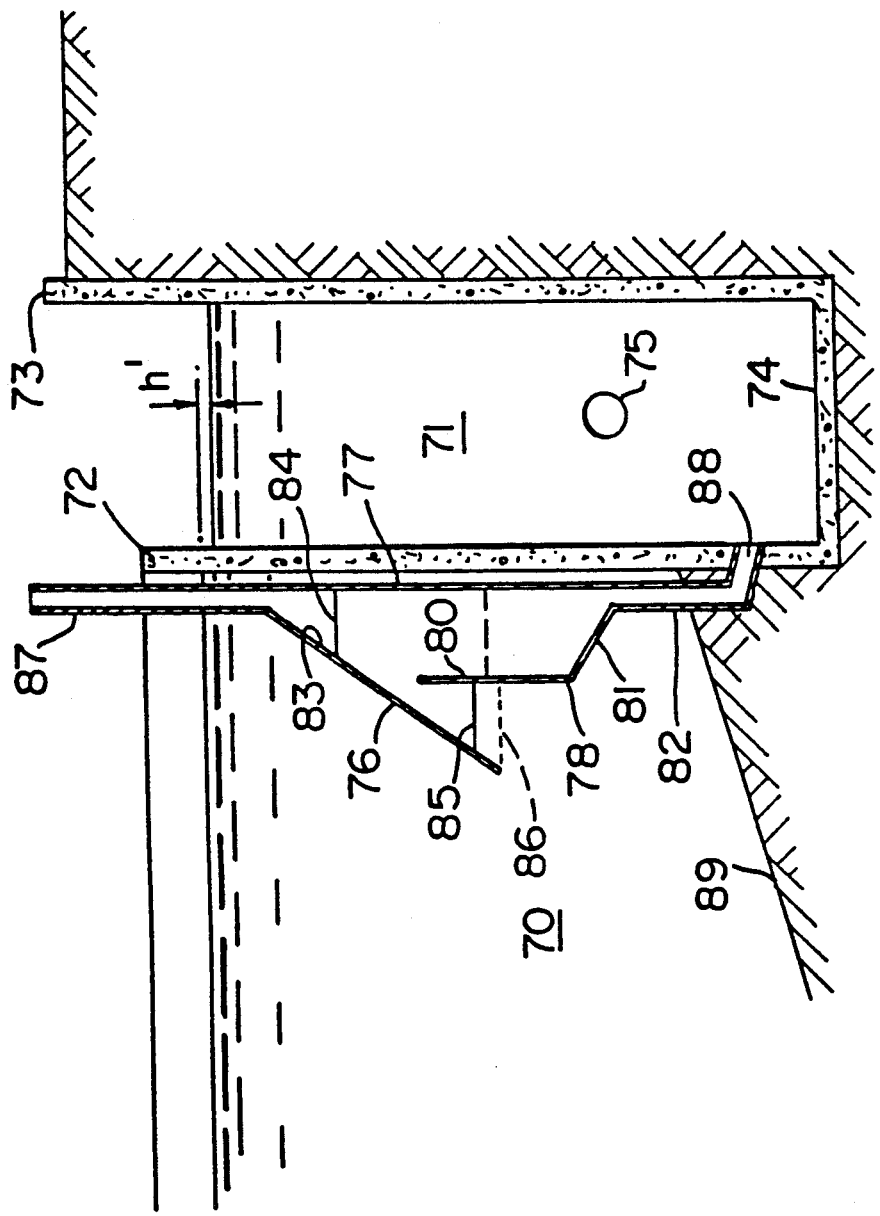
FIG. 8 is a schematic, cross-sectional view of a fifth embodiment of the flow control apparatus of the present invention.

The apparatus of FIG. 8 is similar to FIGS. 1-7, except it is intended to control the rate of flow of treated liquid directly first from a zone or reaction cell 70 to a second zone 71, via an outlet duct or pipe. The zone 71 includes a front wall 72, a rear wall 73, side walls (not shown), and a bottom wall 74 and an outlet 75. The apparatus for removing treated liquid from the cell 70 includes a casing defined by an upper front wall 76 extending outwardly and downwardly from a vertical rear wall 77, and a lower front wall 78 which is overlapped by the upper front wall 76. The lower front wall 78 includes a vertical top portion or submerged weir 80, an inclined shoulder 81 defining an outlet chamber and a bottom connection 82 to zone 71. Of course, side walls (not shown) are provided at each end of the front and rear walls of the casing.

Liquid from the cell 70 enters chamber 83 through the inlet area between the walls 76 and 77 via the gap between the upper front wall 76 and top end of the weir 80. The liquid level and resulting maximum flow through the inlet casing is maintained at a typical desired overflow level 84, zero flow at a typical level 85 or the flush out level 86 beneath the bottom of the casing by selecting the appropriate air pressure. Air is introduced into vented from the chamber via a pipe 87 (or pipes) to achieve the desired flow over the weir at levels between 84 and the top of the weir. Liquid is discharged from the casing via the collection area between 80 and 77, and outlet pipe(s) 88 extending downwardly through the bottom 89 of the cell 70 and through the front wall 72 of the zone 71 to the outlet 75 of the zone 71. In order to provide flushout capabilities for the inlet area without blowout through the outlet pipe, the flow through the outlet pipe 88 enters zone 71 at a flooded elevation below the flushout level 86 plus the head h' where h' is the desired maximum hydraulic head difference between zones 70 and 71. The elevation at which the flooded outlet pipe 88 enter zone 71 can also be equally defined as below the minimum level in zone 71 by the difference of the maximum height of the liquid in the first zone above the flushout level 86. Once the outlet pipe 88 connection to zone 71 is fixed in place, then it is necessary as for all other embodiments, to prevent blowout by control of the minimum liquid level in the second zone 71 to be above the outlet 88 by at least the height of the liquid in the first zone 70 above the top of weir 80. Conventional weirs or overflow devices can be used to establish said minimum liquid level in zone 71. The flow can be measured by a flow meter (not shown) at the outlet pipe 88 or the outlet 75. The desired flow is achieved by actively adjusting the air pressure in the chamber 83 by a control unit (not shown) until the desired flow is recorded by the flow meter, or until the desired water levels have been achieved in zone 70.

Figure 9:
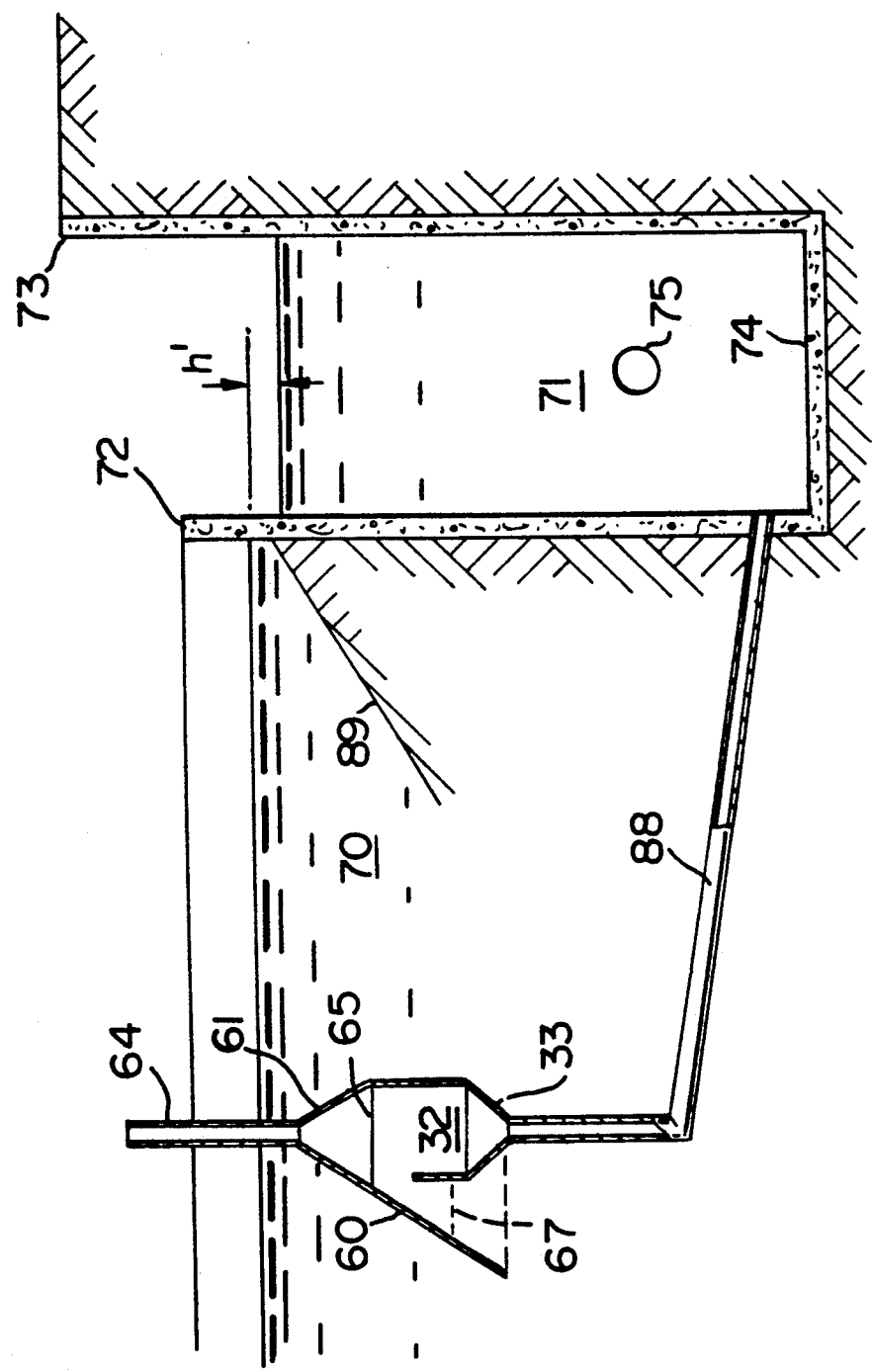
FIG. 9 is a schematic, cross-sectional view of a sixth embodiment of the flow control apparatus of the present invention.

The apparatus of FIG. 9 is similar to that of FIG. 8 and includes a discharge from the submerged weir 32 through the bottom end 33 which is connected to the outlet pipe 88. The outlet chamber is covered by a casing defined by downwardly diverging walls 60 and 61 with air inlet(s) 64 in the upper end thereof. As with the apparatus of FIG. 8, the above described apparatus is used to control the flow of treated liquid from a zone or reaction cell 70 to the zone 71 in conjunction with a water depth or flow measuring device (not shown) and a control unit (not shown) as in the embodiments described above.

Figure 10:
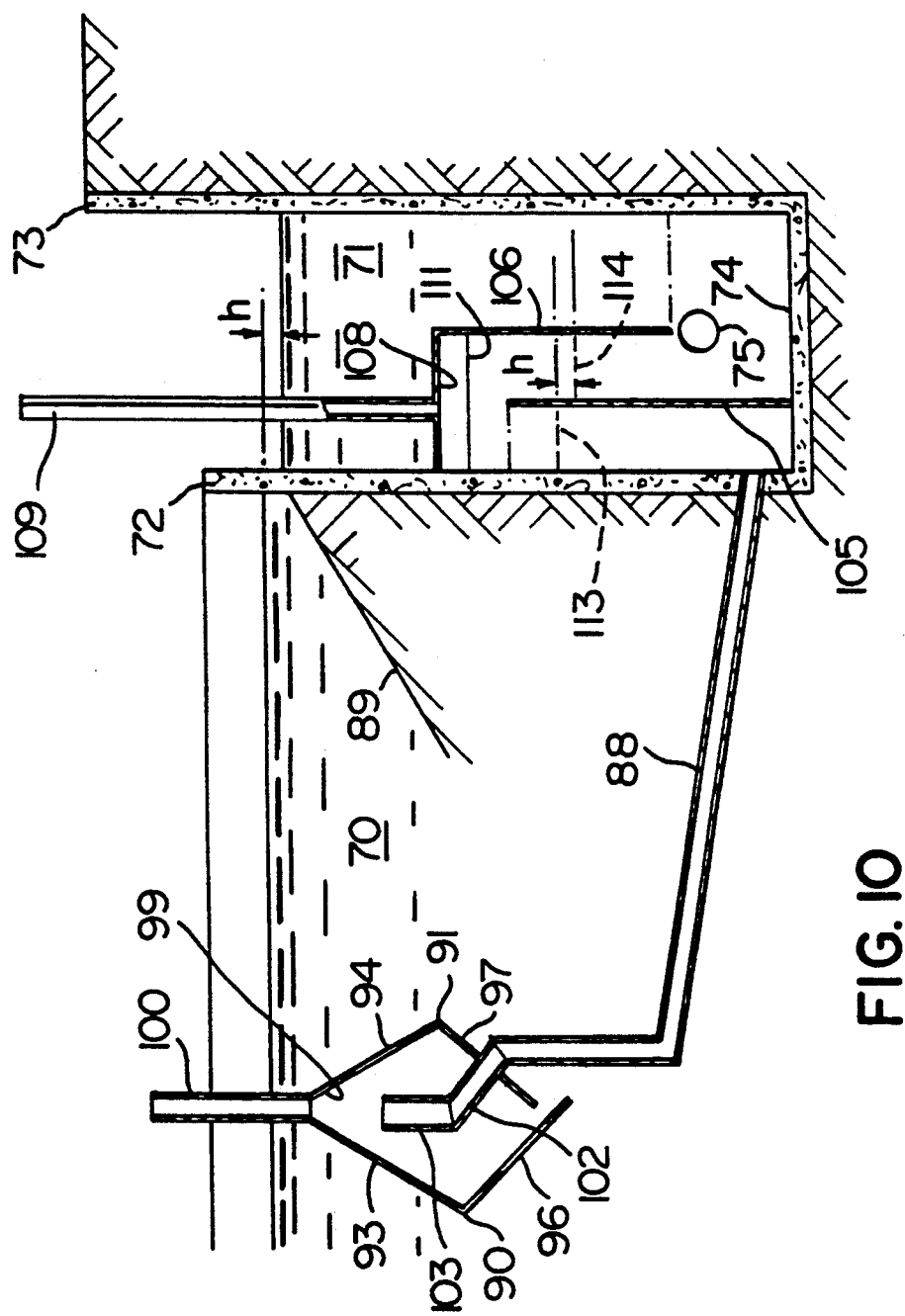
FIG. 10 is a schematic, cross-sectional view of a seventh embodiment of the flow control apparatus of the present invention.

The apparatus of FIG. 10 is similar to that of FIG. 9 and is also intended to control flow and prevent biological solids from accumulating in the discharge of treated liquid from a zone or reaction cell 70 to zone 71, including a flooded but remote inlet casing defined by a pair of walls 90 and 91, which include downwardly flaring upper walls 93 and 94, and converging lower walls 96 and 97. End walls are provided to complete the casing but are not shown. The end of wall 96 extends vertically beyond and below the end of wall 97 to prevent air entrainment currents within the chamber 99 and to direct liquid flow away from the chamber flooded inlet 99 which otherwise would permit solids to stir up inside the chamber during treatment, aeration and mixing in cell 70, which would contaminate the discharge through the duct 88. As in other embodiments of the invention, the submerged end walls 90 and 91 normally slope by angles between 55 and 70 degrees or more to the horizontal in order to prevent solids from accumulating on the interior or exterior of the chamber 99. Of course, as for all embodiments, the slope of the walls can be changed to suit particular treatment systems and wastewater characteristics, and a top wall may be utilized with a horizontal or near horizontal orientation provided the location of the top is well above the surface or is at or near the surface of the reaction cell so that biological solids will not accumulate on the top because they are swept clean during each aeration cycle. Air is freely vented into or out of the chamber 99 at all times via pipes 100 (one shown). Liquid is discharged from the chamber 99 via flooded liquid ducts 102, 103, and 88. The duct 102 extends downwardly through the lower portion 97 of the end wall 91 into fluid communication with the outlet duct 88 extending into the bottom end of the zone 71. A submerged weir defined by a partition 105 is provided in the zone 71. An inverted L-shaped partition 106 is provided above the partition and weir 105, and as for other embodiments to define the outlet from the weir and prevent blowout of gas from chamber 108 to zone 71, the partition extends below the elevation of the top of the weir by more than the head h' which is the maximum hydraulic head difference between zones 70 and 71. Gas under active pressure from a flow control unit (not shown) is introduced into or vented from the chamber 108 beneath the partition 106 via a pipe 109. Thus, the flow of liquid from 88 and over the weir 105 is established by the control unit and the depth of liquid in one 70 or flow measuring device (not shown) and by gas actively being introduced or vented through the pipe 109. By maintaining the liquid level between the top of the weir and level 111 controlled flow is possible, while at levels 113 and 114, no weir flow occurs between the zone or reaction cell 70 and zone 71.

In each of the above described apparatuses, low pressure air is used in a chamber above a weir for controlling the flow of water or another liquid from a first zone into a second treatment zone or cell, for controlling the flow of liquid through several zones or cells of a treatment system, or for controlling the flow of treated liquid out of a treatment zone or cell into a final treated effluent collection zone of a system. In each case, no moving parts are used in the apparatus.

When using the apparatus of FIGS. 1 and 2 or 3 and 4, wastewater is introduced into the chamber 11 through the inlet pipe 18. The liquid level in the chamber 11 only needs to be as high as h, the hydraulic head loss between the zones, higher than the level in the treatment zone or cell 2, so that gravitational flow of the liquid stream can occur. The liquid level is measured using the detector 28 to facilitate a collective response and to record any operation problems.

The outlet ducts 22 can be directed to one or more treatment zones 2, and if required, the liquid flow to each zone 2 may be measured using the flow detector 23. Alternatively, only one flow detector can be located on the inlet duct to the inlet chamber to measure the total flow and the weir flow control chambers used to direct the flow to selected downstream treatment zones on a time and/or total flow volume basis. Details of the requirements for duration of reaction time, level control, as well as flow through rate variations in any of the zones or cells, can all be translated by a conventional control unit 25 into the requirements of controlled flow needed over the weir at any time, and then transmitted to the air pressure component of control unit 25. The unit 25 actively controls the air pressure in the chambers 16 at all times to achieve the individually controlled flow as required and which can be accurately measured by flow detector 23 in each outlet duct 22 if required. When liquid is to start to be discharged from one of the chambers 16, the control unit 25 permits the release of air from the appropriate chamber 16, which allows the liquid level to rise. Liquid starts to flow over the weir 20 or 32 until the desired flow rate, liquid depth, or time of flow is achieved and liquid continues to be discharged via the outlet duct 22 to zone 2 until the control unit causes the flow to change or stop.

The apparatus of FIG. 5 operates in the same manner as the apparatuses of FIGS. 1 to 4, the air release column 38 being integrated into the inlet duct 36, to prevent the entrainment of air flowing with liquid into the air pressure chamber.

The apparatus of FIGS. 6 and 7 can be used to control liquid levels, duration of reaction times and direction and timing of flow through multiple contiguous cells, all as translated into the requirements of flow at any time from one zone in a reactor cell 55 past the weir 66 and partition or baffle 69 to the next zone of the reactor cell 56. As for all embodiments of the invention, the air pressure in the chamber 62 controls the liquid level 65, and consequently the rate of liquid flow over the weir 66. This low cost method of flow control and connection of two contiguous treatment zones also protects the separating partition or baffle 69 from significant, possible accidental, high pressure differences between the zones 55 and 56. The maximum pressure differences are limited to the preselected difference in elevation between the top of the weir 66 and the bottom of downwardly flaring wall 61.

Finally, the apparatus makes it possible to safely, accurately, and evenly distribute water flow over long lengths between contiguous zones or cells by controlling the flow over the submerged weirs and thus eliminate back mixing or forward mixing between a first cell undergoing mixing and aeration, and a second cell undergoing quiescent settling of solids.

The apparatus of FIG. 8 is an air controlled, single weir device, which is intended to make it possible to prevent flow and simultaneously prevent defined by the solids in the inlet or discharge passage defined by the walls 76, 77 and 78 during treatment periods of biological solids mixing in the area 70 and then subsequently to control the flow of treated wastewater out of the treatment cell to another cell. This embodiment of the air controlled weir device is suitable for installation at one side or across the end of a treatment cell.

A typical cycle of operation for the apparatus of FIG. 8 is set out in the following. During the normal biological treatment step of aeration and mixing of biological solids in cell 70, active air pressure between the walls 76 and 77 is such that the liquid level 85 is maintained beneath the top of the weir 80. At completion of aeration and biological treatment while the suspended biological solids are settling, air may be introduced into the chamber to displace the liquid to level 86. At level 86, air is released from beneath the edge of the wall 76 for purging any floating material which may have accumulated in the apparatus during treatment cycles in the reaction cell 70. After completion of mixing, aeration, and purge of floating material in the apparatus and settling of biological solids in cell 70, the system control unit (not shown) commands the release of treated wastewater from the zone 70 to the final treated effluent zone 71. The supply of air is then cut off, and air is released from the chamber 83 via pipe 87. Air release continues until the liquid level beneath the casing reaches the operational overflow level 84 at the desired flow rate measured at outlet 75 or outlet pipe 88 by a flow measuring device (not shown). At such level effluent flows over the weir 80 and the liquid is discharged through the outlet pipe 88 to zone 71. When the treated effluent being discharged has reached the desired accumulated time or volume, additional air under pressure is introduced into the chamber 83 through the pipe 87 to return the liquid to level 85, which is "off". Thus, a cycle of operation is completed.

The apparatus of FIG. 9 operates on the same principle as the apparatus of FIG. 8, except that the device is provided for use in positions remote from the cell 71.

The apparatus of FIG. 10 operates on the same principle as FIG. 9 except that the inlet to the flow control weir in cell 71 is located in reaction cell 70 remote from the weir and is used to control the degree of mixing in the inlet and is connected by a duct to the submerged flow control weir chamber, and outlet collection system for treated wastewater located in cell 71. The sloping sides of the flooded inlet collection system prevent settleable solids from accumulating on the casing. Instead of controlling flow in an entry weir chamber located in a first cell 70, as for previous embodiments, flow is controlled in a second or treated effluent cell 71 using an air controlled weir 105 in chamber 108. The entry chamber 99 inlet collection system is always filled with water (flooded) and so transmits to the weir the cell 70 hydraulic head h above the level of cell 71. When the air pressure in the chamber 108 increases, the water drops from level 111 to levels 113 and 114, i.e., beneath the top of the weir 105, so that no flow passes through the outlet. When the air pressure in the chamber 108 is released through the pipe 109, the water rises toward level 111 above the weir 105 and effluent overflows the weir. The flow rate is limited by the total available head h and head loss through the system, but up to this limit depends on the difference between the water level 111 and the top of the weir 105, which in turn is controlled by the air pressure inside chamber 108. As for all embodiments, such air pressure is selected and controlled by the control device to make it possible to achieve the desired flow rate as determined by the feedback from the flow measured by the flow measuring device located at outlet 75 or inlet duct 88.

I claim:

1. An apparatus for controlling the flow of liquid from a first zone to a second zone comprising casing means defining a weir chamber, weir means in said weir chamber, said weir means submerged with respect to the liquid level in said first zone, liquid inlet means on one side of said casing means for introducing liquid from said first zone into said weir chamber; liquid outlet means on the other side of said casing means for discharging liquid from said weir chamber to said second zone at a flooded level below a controlled minimum liquid level in said second zone by at least the height of liquid in said first zone above the top of said weir means so as to prevent blowout of gas through said outlet means; and duct means in said casing means for introducing and venting gas under pressure into said weir chamber for controlling the liquid level in said weir chamber and consequently the flow of liquid over said weir means between said inlet means and said outlet means, and consequently between said first and said second zones.

2. An apparatus according to claim 1, including flow measuring means for measuring the flow of liquid through said liquid outlet means; and control means connected to said flow measure means for controlling the gas pressure in said weir chamber.

3. An apparatus according to claim 2, including first partition means dividing said casing means in said inlet means into a plurality of weir chambers, said duct means introducing gas under pressure separately into each said weir chamber.

4. An apparatus according to claim 3, wherein said weir means includes a rectilinear weir extending across each said weir chamber perpendicular to the direction of liquid flow.

5. An apparatus according to claim 3, wherein said weir means includes a cylindrical weir in fluid communication with said liquid outlet means.

6. An apparatus according to claim 2, including means on said liquid inlet means for release of gases form the liquid in said inlet means.

7. An apparatus according to claim 2, wherein said casing means includes a pair of downwardly diverging wall means for suspension in first and second zones of a liquid container, said weir means extending upwardly from the bottom of said container to a location between said wall means and said duct means for introducing gas under pressure into the upper ends of said wall means and for the release of gas therefrom.

8. An apparatus according to claim 7, wherein said weir means includes a rectilinear barrier extending across said weir chamber, centrally between said wall means.

9. An apparatus according to claim 7, wherein a first said wall means extends vertically to the bottom of the container, a second said wall means extending downwardly and outwardly from said first wall means to define said weir chamber, and a third wall means extends upwardly and outwardly from the bottom of the container into the area between said first and second wall means for defining said weir means and inlet to said liquid outlet means from said weir chamber.

10. An apparatus according to claim 2, wherein said inlet means includes; a remote flooded casing means in said first zone with a pair of inclined upper end wall means and downwardly converging lower end wall means defining said flooded casing means for supporting a flooded liquid outlet means, preventing mixing of liquid or accumulation of solids in said flooded casing means by one lower end wall means extending below and vertically beyond the end of the other lower wall means; said remote flooded casing means includes a top vent to atmosphere to ensure a flooded casing means and a duct means connected to said weir chamber located in said second zone for controlling the flow of liquid from said first zone to said second zone.

11. A method for controlling the flow of a liquid from a first zone to a second zone comprising the steps of:

providing a casing between said first and second zones defining a weir chamber and a weir submerged with respect to the liquid in said first zone; introducing liquid from said first zone into one side of said weir chamber; discharging liquid from the other side of the said weir chamber to said second zone; establishing and substantially continuously maintaining an air pocket in said weir chamber; actively introducing and venting gas under pressure into and out of said chamber for controlling the size of said air pocket for controlling the liquid level in said weir chamber and consequently substantially continuously controlling the flow of liquid over said weir means between said first and second zones; and controlling the minimum liquid level in said second zone so as to prevent blowout of gas from said weir chamber through said discharge means.

12. A method according to claim 11 including the steps of measuring the flow of liquid to said first zone; and controlling the gas pressure in said weir chamber in accordance with the required flow of liquid over said weir means.

13. A method according to claim 11 including the steps of measuring the flow of liquid from said second zone; and controlling the gas pressure in said weir chamber in accordance with the required flow of liquid over said weir means.

14. An apparatus for controlling the flow of liquid from a first zone to a second zone comprising casing means defining a weir chamber, weir means in said weir chamber, said weir means submerged with respect to the liquid level in said first zone, liquid inlet means on one side of said casing means for introducing liquid from said first zone into said weir chamber; liquid outlet means on the other side of said casing means for discharging liquid from said weir chamber to said second zone at a flooded level below the controlled minimum liquid level in said second zone by at least the height of liquid in said first zone above the top of said weir means so as to prevent blowout of gas through said outlet means; duct means in said casing means for introducing and venting gas under pressure into said weir chamber for controlling the liquid level in said weir chamber and consequently the flow of liquid over said weir means between said inlet means and said outlet means, and consequently between said first and said second zones; and first partition means dividing said casing means in said inlet means into a plurality of weir chambers, said duct means introducing gas under pressure separately into each said weir chamber.

15. An apparatus for controlling the flow of liquid from a first zone to a second zone comprising casing means defining a weir chamber, weir means in said weir chamber, said weir means submerged with respect to the liquid level in said first zone, liquid inlet means on one side of said casing means for introducing liquid from said first zone into said weir chamber; liquid outlet means on the other side of said casing means for discharging liquid from said weir chamber to said second zone at a flooded level below the controlled minimum liquid level in said second zone by at least the height of liquid in said first zone above the top of said weir means so as to prevent blowout of gas through said outlet means; said weir means includes a rectilinear weir extending across said weir chamber perpendicular to the direction of liquid flow; and duct means in said casing means for introducing and venting gas under pressure into said weir chamber for controlling the liquid level in said weir chamber and consequently the flow of liquid over said weir means between said inlet means and said outlet means, and consequently between said first and said second zones.

16. An apparatus for controlling the flow of a liquid from a first zone to a second zone, said apparatus comprising:
casing means for defining a weir chamber;
weir means provided in said weir chamber for guiding a liquid;
said weir means being submerged with respect to the liquid level in a first zone;
liquid inlet means disposed in said casing means for introducing a liquid from a first zone into said weir chamber;
liquid outlet means disposed in said casing means at a distance from said liquid inlet means for discharging liquid from said weir chamber to a second zone;
said liquid outlet means being disposed at a flooded level at a distance below the liquid level in a second zone, the distance being sufficiently great so as to prevent blowout of a gas through said outlet means;
a duct means fluidly connected to said weir chamber for introducing a gas into said weir chamber;
said weir chamber being configured for defining and substantially continuously maintaining an air pocket in said weir chamber; and
control means operatively associated with said duct means for introducing gas into said weir chamber for controlling the size of said air pocket for varying the liquid level in said weir chamber for controlling the flow of a liquid over said weir means between said inlet means and said outlet means for regulating the flow of liquid between a first zone and a second zone.

* * * * *